(12) United States Patent
Galat et al.

(10) Patent No.: US 12,358,578 B2
(45) Date of Patent: Jul. 15, 2025

(54) IDLER FOR UNDERCARRIAGE SYSTEM HAVING SACRIFICIAL WEAR RINGS AND WEAR RING FOR SAME

(71) Applicant: Caterpillar Inc., Peoria, IL (US)

(72) Inventors: Michael Stephen Galat, Peoria, IL (US); Temitope Olayemi Akinlua, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 785 days.

(21) Appl. No.: 17/530,284

(22) Filed: Nov. 18, 2021

(65) Prior Publication Data

US 2023/0150593 A1    May 18, 2023

(51) Int. Cl.
*B62D 55/14* (2006.01)

(52) U.S. Cl.
CPC ................... *B62D 55/145* (2013.01)

(58) Field of Classification Search
CPC ........ B62D 55/145; F16B 39/24; F16B 39/10; Y10S 411/958
See application file for complete search history.

(56) References Cited

U.S. PATENT DOCUMENTS

| | | | | |
|---|---|---|---|---|
| 329,738 A | * | 11/1885 | Harvey | F16B 39/24 411/157 |
| 440,631 A | * | 11/1890 | Harvey | F16B 39/24 411/157 |
| 982,763 A | * | 1/1911 | Blakey | F16B 39/24 411/953 |
| 1,539,348 A | * | 5/1925 | Botscheller | F16B 39/24 411/956 |
| 1,709,933 A | * | 4/1929 | Cowan | B60S 1/18 411/152 |
| 2,184,252 A | * | 12/1939 | Garrett | F16B 39/24 411/152 |
| 3,955,855 A | | 5/1976 | Massieon et al. | |
| 4,818,041 A | | 4/1989 | Oertly | |
| 4,890,892 A | * | 1/1990 | Haslett | B62D 55/145 295/31.1 |
| 5,302,012 A | | 4/1994 | Dester et al. | |
| 5,704,697 A | | 1/1998 | Ketting et al. | |
| 5,887,958 A | | 3/1999 | Bissi et al. | |
| 6,322,173 B1 | | 11/2001 | Maguire et al. | |
| 7,614,709 B2 | | 11/2009 | Oertly | |
| 7,798,579 B2 | | 9/2010 | Mulligan | |

(Continued)

FOREIGN PATENT DOCUMENTS

JP    S55113681    8/1980

OTHER PUBLICATIONS

Written Opinion and International Search Report for Int'l. Patent Appln. No. PCT/US2022/079995, mailed Mar. 10, 2023 (12 pgs).

*Primary Examiner* — Jason R Bellinger

(57) ABSTRACT

An idler for an undercarriage system in a track-type machine includes an idler body having an outer rim surface extending circumferentially around an idler axis of rotation and forming a centrally located guide flange. The outer rim surface further forms a first ring channel and a second ring channel upon a first axial side and a second axial side of the centrally located guide flange, respectively. A first sacrificial wear ring is seated in the first ring channel and a second sacrificial wear ring is seated in the second ring channel.

18 Claims, 2 Drawing Sheets

(56) References Cited

U.S. PATENT DOCUMENTS

| | | |
|---|---|---|
| 7,914,086 B2 | 3/2011 | Mulligan |
| 8,100,483 B2 | 12/2012 | Diekevers et al. |
| 8,770,676 B2 | 7/2014 | Yelistratov |
| 8,905,493 B2 | 12/2014 | Liu |
| 9,045,180 B2 | 6/2015 | Brewer et al. |
| 9,290,217 B2 | 3/2016 | Steiner |
| 9,550,537 B2 | 1/2017 | Steiner et al. |
| 9,663,163 B2 | 5/2017 | Hobe et al. |
| 10,668,963 B2 | 6/2020 | Kita et al. |
| 2005/0253453 A1 | 11/2005 | Miller |
| 2008/0116698 A1* | 5/2008 | Berenfield ............. B65D 45/32 |
| | | 215/276 |
| 2010/0072813 A1 | 3/2010 | McRae et al. |
| 2022/0194495 A1* | 6/2022 | Steiner ................. B62D 55/145 |
| 2023/0150592 A1* | 5/2023 | Galat ................... B62D 55/145 |
| | | 305/194 |

* cited by examiner

IDLER FOR UNDERCARRIAGE SYSTEM HAVING SACRIFICIAL WEAR RINGS AND WEAR RING FOR SAME

TECHNICAL FIELD

The present disclosure relates generally to an idler for an undercarriage system in a track-type machine, and more particularly to an idler having sacrificial wear rings seated in ring channels in an outer rim surface of the idler.

BACKGROUND

Track-type machines are used throughout the world in a great many different off-highway applications. In a typical configuration each of two ground-engaging tracks in a machine includes an endless loop of track links in two parallel track chains extending about rotating elements including one or more idlers and a drive sprocket. Track shoes, commonly equipped with grousers, are attached to the track chains and contact a substrate to propel and steer the machine. In rough, uneven, rocky, steep, and/or slippery field service environments track-type machines are indispensable for many activities.

Due to the nature of substrate materials and service conditions, wear between and among components in an undercarriage system of a track-type machine can be relatively severe. In view of the wear phenomena, and the necessity for generally robust and sophisticated track and undercarriage construction, inspection, servicing, and replacement of undercarriage parts is routine. As noted above, one or more idlers are typically provided which rotate passively in contact with the track as the track advances during service. The idler is commonly arranged to rotate in contact with track rails formed by the parallel chains of track links. Over the course of time material of the contacting components tends to be worn away, eventually requiring replacement of the idler.

Various proposals are known for reuse, repair, and otherwise extending idler service life. In commonly owned U.S. Pat. No. 8,770,672 to Yelistratov, an undercarriage system includes an idler having a compound annular rim capping a hub and formed of a relatively higher hardness metallic material. The use of relatively higher hardness metallic material apparently is intended to extend idler service life, and the disclosed techniques can enable replacement of worn-away material in a used idler, for example. While Yelistratov may have various applications and advantages, there is always room for improvement and development of alternative strategies.

SUMMARY

In one aspect, an idler for an undercarriage system in a track-type machine includes an idler body having an outer rim surface extending circumferentially around an idler axis of rotation and forming a centrally located guide flange, and an inner rim surface. The outer rim surface forms a first ring channel upon a first axial side of the centrally located guide flange and a second ring channel upon a second axial side of the centrally located guide flange. Each of the first ring channel and the second ring channel extends circumferentially and continuously around the idler axis of rotation. The idler further includes a first sacrificial wear ring seated in the first ring channel, and a second sacrificial wear ring seated in the second ring channel.

In another aspect, an idler for an undercarriage system in a track-type machine includes an idler body having an outer rim surface extending circumferentially around an idler axis of rotation and forming a centrally located guide flange, an inner rim surface, a first axial end face, and a second axial end face. The outer rim surface further forms a first ring channel and a second ring channel structured to receive, respectively, a first sacrificial wear ring and a second sacrificial wear ring. The first ring channel extends circumferentially and continuously around the idler axis of rotation and includes an inboard channel wall spaced axially outward of the centrally located guide flange, and an outboard channel wall spaced axially inward of the first axial end face. The second ring channel extends circumferentially and continuously around the idler axis of rotation and includes an inboard channel wall spaced axially outward of the centrally located guide flange, and an outboard channel wall spaced axially inward of the second axial end face.

In still another aspect, a sacrificial wear ring for an idler in an undercarriage system includes a one-piece metallic ring body including an outer link-contact surface and an inner idler-contact surface each extending circumferentially around a ring center axis between a first ring body end and a second ring body end. The one-piece metallic ring body further includes a first ring axial side surface and a second ring axial side surface oriented normal to the ring center axis and extending from the outer link-contact surface to the inner idler-contact surface. The one-piece metallic ring body is elastically deformable between an installation configuration where a split gap extends in a circumferential direction between the first ring body end and the second ring body end, and a service configuration where the first ring body end and the second ring body end are in abutment and the split gap is closed. A ring width dimension (RW) is defined between the first ring axial side surface and the second ring axial side surface, and a ring thickness dimension (RT) is defined between the outer link-contact surface and the inner idler-contact surface. A ratio of RW to RT is from 2.5 to 5.0.

DETAILED DESCRIPTION

Figure 1:
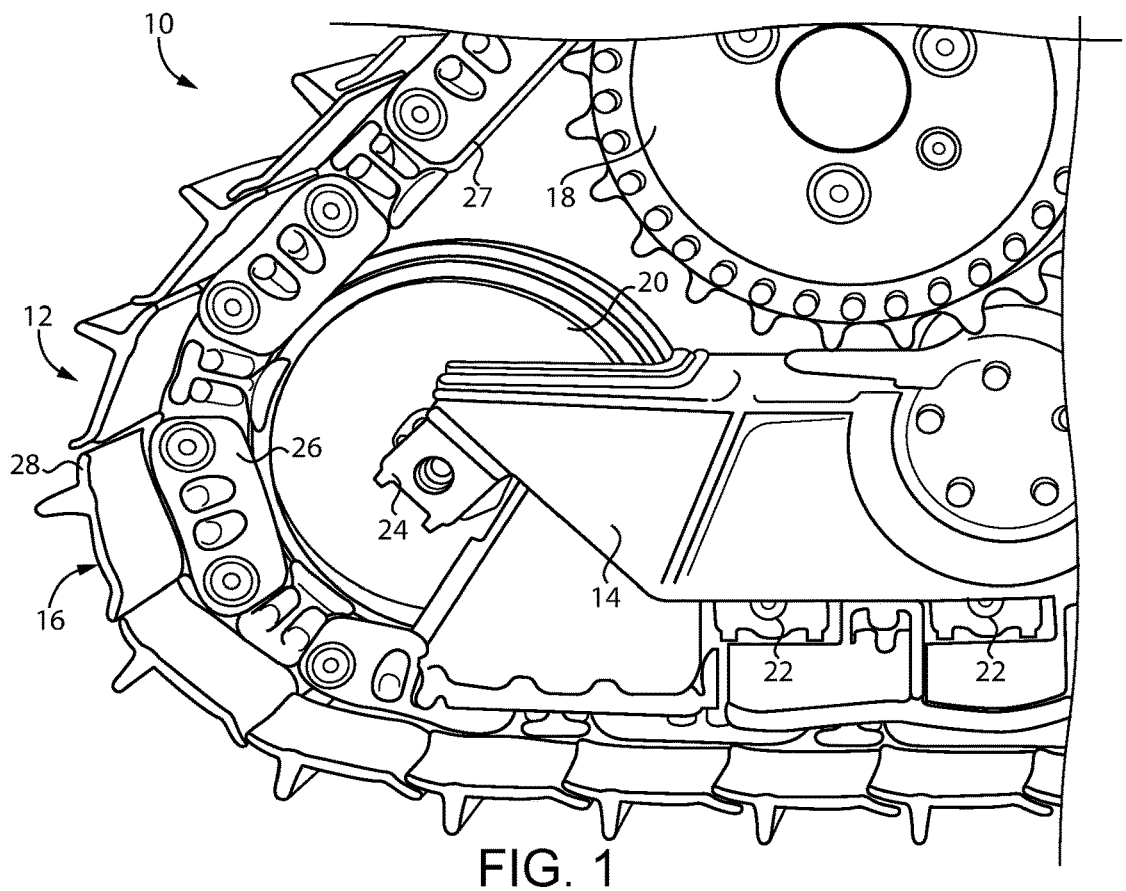
FIG. 1 is a side diagrammatic view of a portion of an undercarriage system in a track-type machine.

Referring to FIG. 1, there is shown a track-type machine 10 including an undercarriage system 12, according to one embodiment. Undercarriage system 12 includes a track roller frame 14, a track 16, a drive sprocket 18, an idler 20, and a plurality of track rollers 22 coupled to a track roller frame 14. Ground-engaging track 16 includes a plurality of track links 26 coupled together end-to-end to form an endless loop extending about the various track-contacting components. Track links 26 may be attached to track shoes 28 equipped with grousers, with track links together forming a track rail 27. Track rail 27 is one of two track rails formed by two parallel track chains of track links 26 in the illustrated embodiment. A second ground-engaging track, idler, drive sprocket, et cetera, may be conventionally positioned upon an opposite side of track-type machine from that shown. Idler 20 and track rollers 22 ride upon track rail 27 during advancing track 16 to propel and/or steer track-type machine 10. In the illustrated embodiment idler 20 is a back idler, and a similar or substantially identical front idler may be positioned at an opposite end of track roller frame 14. Idler 26 is supported for rotation within idler blocks 24, one of which is visible in the illustration of FIG. 1. Track 16 is arranged in a so-called high drive configuration. In other embodiments, track 16 could have an oval configuration, or still another. Undercarriage system 12 can be used in a track-type tractor, a track-type loader, or any of a variety of other types of off-highway machines. In a practical implementation machine 10 is a track-type tractor as might be used for construction, mining, forestry, or a variety of other applications. As will be further apparent in view of the following description idler 20 is configured with replaceable sacrificial wear parts for extended service life in undercarriage system 12.

Figure 2:
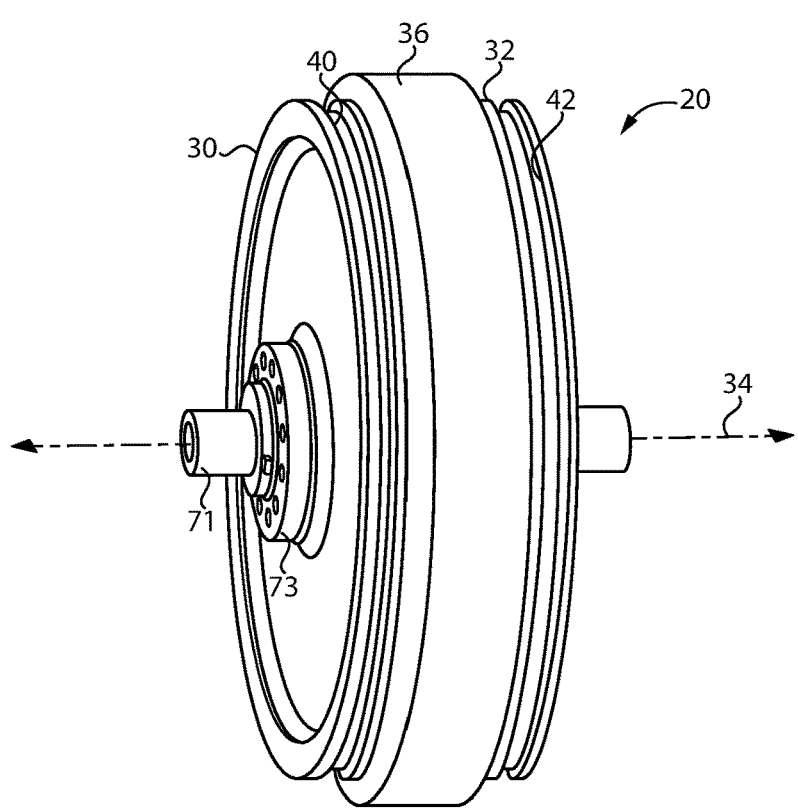
FIG. 2 is a diagrammatic view of an idler, according to one embodiment.
Figure 3:
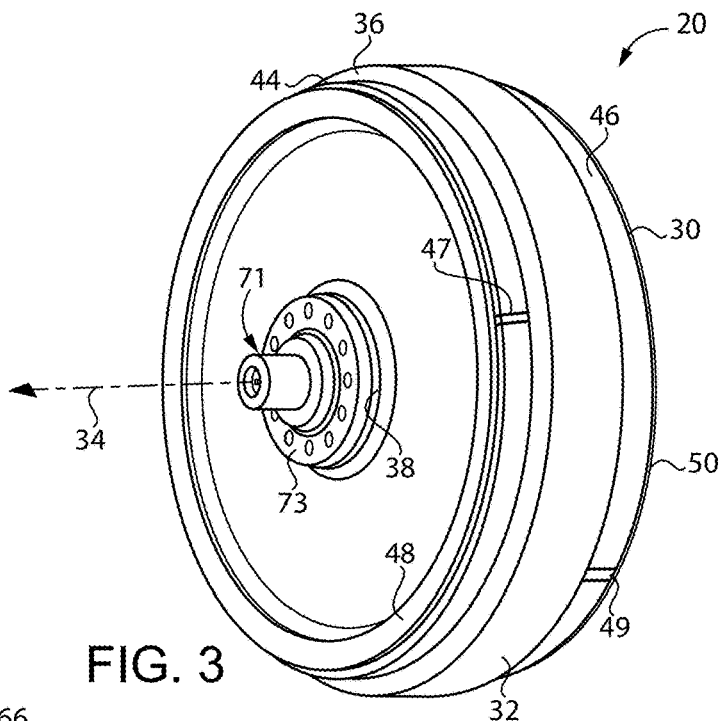
FIG. 3 is a diagrammatic view of an idler equipped with sacrificial wear rings, according to one embodiment.
Figure 4:
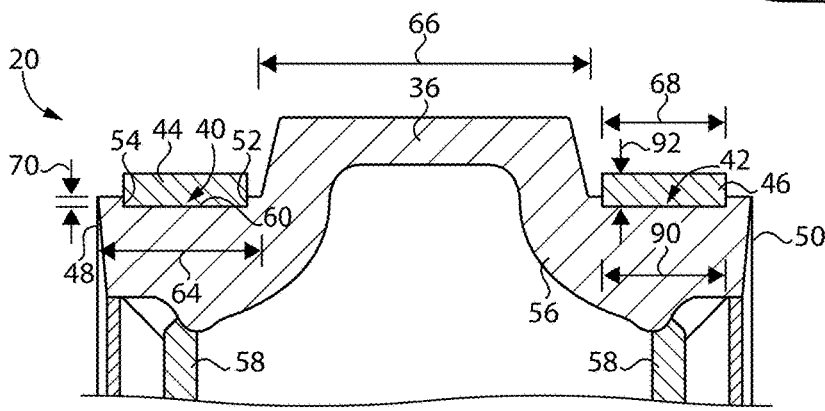
FIG. 4 is a sectioned diagrammatic view of a portion of an idler equipped with sacrificial wear rings, according to one embodiment.

Referring also now to FIGS. 2-4, idler 20 includes an idler body 30 having an outer rim surface 32 extending circumferentially around an idler axis of rotation 34 and forming a centrally located guide flange 36. Idler body 30 also includes an inner rim surface 38 which may form a shaft bore extending between a first axial side and a second axial side of idler 20. Idler body 30 may be a one-piece forging of a suitable iron, steel, or other alloy metallic material. During service, guide flange 36 may be received between parallel chains of track links 26 and assists in maintaining idler 20 and track 16 in a desired arrangement. An idler shaft 71 extends through idler body 30 and rotatably journals idler body 30.

Components including journal bearings, thrust bearings, and seals, for example, may be within idler body 30 and supported on or around idler shaft 71. A clamping ring or plate 73 may be attached to idler body 30 by a plurality of bolts, with another counterpart ring or plate hidden from view in the illustrations. In other embodiments, idler body 30 and idler shaft 71 could be fixed to rotate together, with idler shaft 71 being a live shaft supported for rotation in idler blocks 24, or in another suitable arrangement.

As used herein, the terms "radially inward" and "radially outward" are used according to their common definitions relative to idler axis of rotation 34. The terms "axially inward" and "axially outward" are understood to mean directions along or parallel to idler axis of rotation 34 toward and away from, respectively, a geometric center point of idler 20 intersected by idler axis of rotation 34. Idler 20 may be axially symmetric about a central plane oriented normal to idler axis of rotation 34, thus description and discussion herein of parts, structure, or functionality upon one side of idler 20 should be understood by way of analogy to refer to another axial side of idler 20.

Idler body 30 further includes a first axial end face 48 and a second axial end face 50 each extending radially inward from outer rim surface 32. Outer rim surface 32 further forms a first ring channel 40 upon a first axial side of centrally located guide flange 36 and a second ring channel 42 upon a second axial side of centrally located guide flange 36. First ring channel 40 and second ring channel 42 are structured to receive, respectively, a first sacrificial wear ring 44 seated in first ring channel 40 and a second sacrificial wear ring 46 seated in second ring channel 42. Each of first ring channel 40 and second ring channel 42 extends circumferentially and continuously uninterrupted around idler axis of rotation 34.

First ring channel 40 includes an inboard channel wall 52 spaced axially outward of centrally located guide flange 36, and an outboard channel wall 54 spaced axially inward of first axial end face 48. Second ring channel 42 is likewise understood to include an inboard channel wall (not numbered) spaced axially outward of centrally located guide flange 36, and an outboard channel wall (not numbered) spaced axially inward of second axial end face 50. Each inboard channel wall 52 and outboard channel wall 54 may be oriented normal to idler axis of rotation 34 and extends radially inward to a cylindrical channel floor 60 of the respective first ring channel 40 or second ring channel 42. With focus on FIG. 4, idler body 30 may include a hollow rim body 56 with welded attached end plates 58 to form enclosed axial sides of idler 20. In other embodiments, a solid central web or the like could extend between an outer rim region and an inner hub region in a one-piece forging or the like.

As noted above, idler 20 includes a first sacrificial wear ring 44 seated in first ring channel 40, and a second sacrificial wear ring 46 seated in second ring channel 42. The term "sacrificial" is used in reference to expected and intended wearing away of material of first sacrificial wear ring 44 and second sacrificial wear ring 46 during service, as further discussed herein. First sacrificial wear ring 44 and second sacrificial wear ring 46 may each be formed from an elongate single piece of a suitable metallic material produced, for example, by forging. The material forming first sacrificial wear ring 44 and second sacrificial wear ring 46 might be the same as the material forming idler body 30, including iron, for example, or a different material. First sacrificial wear ring 44 and second sacrificial wear ring 46 could be heat treated or hardened by another process in some embodiments. In a practical implementation, each of first sacrificial wear ring 44 and second sacrificial wear ring 46 has a uniform material composition including iron, and a uniform quadrilateral cross-sectional shape between ends of the wear rings, as further discussed herein.

Figure 5:
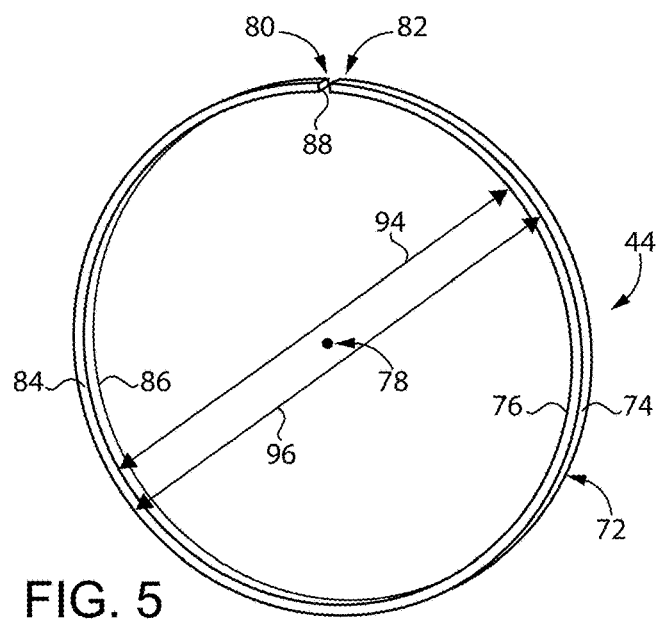
FIG. 5 is a diagrammatic view of a sacrificial wear ring for an idler, according to one embodiment.

Referring also now to FIG. 5, there are shown and identified features of first sacrificial wear ring 44 in further detail. It will be understood that description and discussion of first sacrificial wear ring 44 is understood to refer by way of analogy to any other sacrificial wear ring according to the present disclosure. Sacrificial wear ring 44 includes a one-piece metallic ring body 72, referred to at times herein interchangeably with first sacrificial wear ring 44, including an outer link-contact surface 74 and an inner idler-contact surface 76. Each of outer link-contact surface 74 and inner idler-contact surface 76 extends circumferentially around a ring center axis 78 between a first ring body end 80 and a second ring body end 82. Ring center axis 78 may be coaxially arranged with idler axis of rotation 78 when sacrificial wear ring 44 is installed for service on idler body 30. One-piece metallic ring body 72 further includes a first ring axial side surface 84 and a second ring axial side surface 86 each oriented normal to ring center axis 78 and extending from outer link-contact surface 74 to inner idler-contact surface 76. Outer link-contact surface 74 may be cylindrical. Inner idler-contact surface 76 may also be cylindrical. A ring width dimension (RW) 90 is defined between first ring axial side surface 84 and second ring axial side surface 86. A ring thickness dimension (RT) 92 is defined between outer link-contact surface 74 and inner idler-contact surface 76. In an implementation, a ratio of RW to RT is from 2.5 to 5.0. In a refinement, the ratio of RW to RT is from 2.8 to 4.6.

One-piece metallic ring body 72 may be elastically deformable between an installation configuration where a split gap extends in a circumferential direction between first ring body end 80 and second ring body end 82, and a service configuration where first ring body end 80 and second ring body end 82 are in abutment and split gap 88 is closed. Either of the installation configuration or the service configuration could be a rest configuration, with one-piece metallic ring body 72 deformed in opposition to an internal spring bias from one of the installation configuration or the service configuration to the other of the installation configuration or the service configuration.

From the foregoing description it will be appreciated that one-piece metallic ring body 72 may be springy and can be slipped onto outer idler surface 34 and seated in first ring channel 40. Second sacrificial wear ring 46 can be analogously installed. Once installed in the respective first and second ring channels 40 and 42 assembly of idler 20 can be completed by welding ring body ends 80 and 82. It will be recalled split gap 88 extends between first ring body end 80 and second ring body end 82. When installed on idler body 32 one-piece metallic ring body 72 can be closed, or making use of an internal spring bias permitted to close, and first ring body end 80 and second ring body end 82 placed in abutment for welding. As depicted in FIG. 3 first sacrificial wear ring 44 includes a welded joint 47 attaching the respective ring body ends 80 and 82. Second sacrificial wear ring 46 analogously includes a welded joint 49. Also in a practical implementation first sacrificial wear ring 44 and second sacrificial wear ring 46 are not directly or fixedly attached to idler body 30. Thus, each of first sacrificial wear ring 44 and second sacrificial wear ring 46 may be non-welded attached to idler body 30.

When installed for service each inboard axial side surface or first ring axial side surface 84 may be spaced axially outward of centrally located guide flange 36. Each outboard axial side surface or second ring axial side surface 86 may be spaced axially inward of the respective first axial end face 48 or second axial end face 50. As can be seen from the drawings, in particular FIG. 4, first sacrificial wear ring 44 and second sacrificial wear ring 46 may stand proud of outer rim surface 32.

Returning to dimensional and proportional attributes of first sacrificial wear ring 44, inner idler-contact surface 76 may define an inner diameter dimension (ID) 94 when one-piece metallic ring body 72 is in the service configuration. Outer link-contact surface 74 may define an outer diameter dimension (OD) 96 in the service configuration. A ratio of ID to OD may be from 0.93 to 0.95. In some applications, ID is greater than 600 millimeters. Also in certain applications, RT is greater than 20 millimeters.

As also depicted in FIG. 4, an outboard width dimension (OW) 64 is defined between centrally located guide flange 36 and each respective first axial end face 48 and second axial end face 50. Centrally located guide flange 36 defines an axial width dimension (AW) 66 that is greater than OW. Each of first ring channel 40 and second ring channel 42 defines a channel width dimension (CW) 68 and a channel depth dimension (CD) 70. CW may be greater than 75% of OW and greater than 400% of CD in some embodiments. Proportional and dimensional attributes of wear rings 44 and 46 described herein can be expected to scale across a range of idler sizes, such as a range of idler sizes used in different size track-type tractors.

INDUSTRIAL APPLICABILITY

Referring to the drawings generally, during service idler 20 will rotate with the advancement of track 16 in forward directions or reverse directions about the various track-contacting rotatable elements in undercarriage system 12. Sacrificial wear rings 44 and 46 will rotate in contact with track rail 27 and the track rail hidden from view in the illustration of FIG. 1. Contact between the materials of wear rings 44 and 46, as well as substrate particles and the like, will tend to cause material of wear rings 44 and 46 to wear away. It is contemplated that idler 20 may be maintained in service at least up until such time that material of wear rings 44 and 46 that is radially outward of outer rim surface 32 has worn away and material of idler body 30 is expected to begin to wear.

When undercarriage system 12 has reached a desired or prescribed state of wear, undercarriage system 12 can be disassembled, and idler 20 removed. Wear rings 44 and 46 can be cut and dismantled from idler body 30, and replacement sacrificial wear rings swapped into place and seated in first ring channel 40 and second ring channel 42.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An idler for an undercarriage system in a track-type machine comprising:
    an idler body including an outer rim surface extending circumferentially around an idler axis of rotation and forming a centrally located guide flange, and an inner surface;
    the outer rim surface further forming a first ring channel upon a first axial side of the centrally located guide flange and a second ring channel upon a second axial side of the centrally located guide flange, and each of the first ring channel and the second ring channel extending circumferentially and continuously around the idler axis of rotation;
    a first sacrificial wear ring seated in the first ring channel; and
    a second sacrificial wear ring seated in the second ring channel
        wherein each of the first sacrificial wear ring and the second sacrificial wear ring includes a one-piece ring body having ring body ends attached at a welded joint.

2. The idler of claim 1 wherein each of the first sacrificial wear ring and the second sacrificial wear ring includes a cylindrical link-contact surface, an inner idler-contact surface in contact with the outer rim surface within the respective first ring channel or second ring channel, an inboard axial side surface, and an outboard axial side surface.

3. The idler of claim 2 wherein each inboard axial side surface is spaced axially outward of the centrally located guide flange.

4. The idler of claim 3 wherein the idler further includes a first axial end face and a second axial end face each extending radially inward from the outer rim surface, and each outboard axial side surface is spaced axially inward of the respective first axial end face or second axial end face.

5. The idler of claim 1 wherein each of the first sacrificial wear ring and the second sacrificial wear ring stands proud of the outer rim surface.

6. The idler of claim 1 wherein:
each of the first sacrificial wear ring and the second sacrificial wear ring defines a ring width dimension (RW) and a ring thickness dimension (RT); and
a ratio of the ring width dimension (RW) to the ring thickness dimension (RT) is from 2.5 to 5.0.

7. The idler of claim 1 wherein:
each of the first sacrificial wear ring and the second sacrificial wear ring defines an inner diameter dimension (ID) and an outer diameter dimension (OD); and
a ratio of the inner diameter dimension (ID) to the outer diameter dimension (OD) is from 0.93 to 0.95.

8. An idler for an undercarriage system in a track-type machine comprising:
an idler body including an outer rim surface extending circumferentially around an idler axis of rotation and forming a centrally located guide flange, an inner surface, a first axial end face, and a second axial end face;
the outer rim surface further forming a first ring channel and a second ring channel structured to receive, respectively, a first sacrificial wear ring and a second sacrificial wear ring;
the first ring channel extending circumferentially and continuously around the idler axis of rotation and including an inboard channel wall spaced axially outward of the centrally located guide flange, and an outboard channel wall spaced axially inward of the first axial end face; and
the second ring channel extending circumferentially and continuously around the idler axis of rotation and including an inboard channel wall spaced axially outward of the centrally located guide flange, and an outboard channel wall spaced axially inward of the second axial end face;
wherein each of the first ring channel and the second ring channel defines a channel width dimension (CW) and a channel depth dimension (CD), and the channel width dimension (CW) is greater than 400% of the channel depth dimension (CD).

9. The idler of claim 8 wherein each inboard channel wall and outboard channel wall is oriented normal to the idler axis of rotation and extends radially inward to a cylindrical channel floor of the respective first ring channel or second ring channel.

10. The idler of claim 9 wherein an outboard width dimension (OW) is defined between the centrally located guide flange and each respective first axial end face and second axial end face, and the centrally located guide flange defines an axial width dimension (AW) that is greater than the outboard width dimension (OW).

11. The idler of claim 10 wherein:
each of the first ring channel and the second ring channel defines the channel width dimension (CW) that is greater than 75% of the outboard width dimension (OW).

12. A sacrificial wear ring for an idler in an undercarriage system comprising:
a one-piece metallic ring body including an outer link-contact surface and an inner idler-contact surface each extending circumferentially around a ring center axis between a first ring body end and a second ring body end;
the one-piece metallic ring body further including a first ring axial side surface and a second ring axial side surface oriented normal to the ring center axis and extending from the outer link-contact surface to the inner idler-contact surface;
the one-piece metallic ring body is elastically deformable between an installation configuration where a split gap extends in a circumferential direction between the first ring body end and the second ring body end, and a service configuration where the first ring body end and the second ring body end are in abutment and the split gap is closed;
a ring width dimension (RW) is defined between the first ring axial side surface and the second ring axial side surface;
a ring thickness dimension (RT) is defined between the outer link-contact surface and the inner idler-contact surface; and
a ratio of the ring width dimension (RW) to the ring thickness dimension (RT) is from 2.5 to 5.0, wherein in the service configuration the first ring body end and the second ring body end are attached at a welded joint.

13. The sacrificial wear ring of claim 12 wherein the ratio the ring width dimension (RW) to the ring thickness dimension (RT) is from 2.8 to 4.6.

14. The sacrificial wear ring of claim 12 wherein:
the inner idler-contact surface defines an inner diameter dimension (ID) in the service configuration;
the outer link-contact surface defines an outer diameter dimension (OD) in the service configuration; and
a ratio of the inner diameter dimension (ID) to the outer diameter dimension (OD) is from 0.93 to 0.95.

15. The sacrificial wear ring of claim 14 wherein the inner diameter dimension (ID) is greater than 600 millimeters.

16. The sacrificial wear ring of claim 15 wherein the ring thickness dimension (RT) is greater than 20 millimeters.

17. The sacrificial wear ring of claim 12 wherein the one-piece ring body has a uniform material composition including iron, and a uniform quadrilateral cross-sectional shape between the first ring body end and the second ring body end.

18. An idler for an undercarriage system in a track-type machine comprising:
an idler body including an outer rim surface extending circumferentially around an idler axis of rotation and forming a centrally located guide flange, and an inner surface;
the outer rim surface further forming a first ring channel upon a first axial side of the centrally located guide flange and a second ring channel upon a second axial side of the centrally located guide flange, and each of the first ring channel and the second ring channel extending circumferentially and continuously around the idler axis of rotation;
a first sacrificial wear ring seated in the first ring channel; and
a second sacrificial wear ring seated in the second ring channel wherein each of the first sacrificial wear ring and the second sacrificial wear ring includes a one-piece ring body having ring body ends attached at a welded joint, wherein each of the first sacrificial wear ring and the second sacrificial wear ring is removably attached to the idler outer rim surface.

\* \* \* \* \*